2,957,920

MERCAPTANS FROM ETHERS

Bernard Loev, Philadelphia, and John T. Massengale, West Chester, Pa., assignors to Pennsalt Chemicals Corporation, Philadelphia, Pa., a corporation of Pennsylvania No Drawing. Filed Apr. 10, 1958, Ser. No. 727,551

5 Claims. (Cl. 260—609)

This invention relates to a method for the preparation of mercaptans, and more particularly, provides a method for the preparation of mercaptans which comprises reacting an ether with hydrogen sulfide.

The possibility of using ethers as mercaptan synthesis raw materials has received little attention hitherto. It is well known that cyclic ethers can be reacted with hydrogen sulfide over an alumina catalyst to produce cyclic sulfides. However, this is distinct from the problem herein considered, in that sulfides are formed without cleavage of the molecule, as compared to the splitting of the ether molecule which is involved when mercaptans are produced therefrom.

It has recently been reported that certain promoted alumina catalysts can be employed to effect the formation of mercaptans by the reaction of hydrogen sulfide with ethers. This report states that substantial conversions of primary aliphatic ethers to primary alkyl mercaptans can be obtained at atmospheric pressure.

However, the utility of alumina-based catalysts for the conversion of ethers to mercaptans appears to be limited. Thus for example, it has been found that only extremely low yields of a secondary mercaptan such as isopropyl mercaptan are obtained when diisopropyl ether is reacted with hydrogen sulfide at 582° F. (300° C.) and atmospheric pressure.

It is an object of this invention to provide a novel method for the preparation of mercaptans.

A particular object of this invention is to provide a novel method for the preparation of mercaptans by the reaction of functionally aliphatic ethers with hydrogen sulfide.

It is a further object to provide a novel and improved method for the synthesis of secondary mercaptans.

Another object is to provide a method for the synthesis of isopropyl mercaptan.

These and other objects will become apparent from a consideration of the following specification and claims.

It has now been found that mercaptans can be prepared advantageously by contacting an ether with hydrogen sulfide under conversion conditions of temperature and pressure, in the presence of an oxygen acid catalyst. The reaction whereby the ether is cleaved to form mercaptan in accordance with the presently provided method may be represented schematically as follows

ROR′+2H$_2$S→RSH+R′SH+H$_2$O where R and R′ represent the organic radicals attached to the ether oxygen atom.

The process of this invention has many advantageous features for mercaptan manufacture. The presently employed ethers are particularly desirable starting materials for preparation of mercaptans: they are more stable and more easily purified than olefins, and they contain only half as much oxygen as do alcohols per mole of mercaptan produced, so that they are thus a less wasteful and a more favorable starting material for mercaptan preparation. Good conversions to mercaptan are obtained by the process of the invention, and these conversions are particularly notable in respect to the ordinarily difficultly obtainable secondary mercaptans. The process is adapted to continuous operation, including recycling of the reactor effluent, after removal of mercaptan formed, to produce additional mercaptan.

Ethers susceptible to conversion to mercaptan by the present process are of the formula ROR′ where R and R′ are individual hydrocarbon radicals containing an aliphatic carbon atom at the point of attachment to the ether O atom. Ethers of this formula may be designated "functionally aliphatic" ethers, with reference to the aliphatic nature of the carbon atoms attached to the functional oxygen atom of the ether.

The process of the invention as described herein has been found to be effective for the production of mercaptans in good yields from ethers of the formula ROR′ where R and R′ are as defined above and each contains from 1 to 8 carbon atoms. Ethers of this class comprise compounds in which each radical R and R′ is aliphatic-straight-chain, branched, or cyclic- or araliphatic, and in which the two radicals R and R′ in the formula ROR′ are the same or different. The class of acyclic aliphatic ethers of this formula are exemplified by dimethyl ether, diethyl ether, di-n-propyl ether, diisopropyl ether, isopropyl methyl ether, isopropyl n-propyl ether, allyl isopropyl ether, diisobutyl ether, diamyl ether, methyl tert-amyl ether, ethyl 1-methylallyl ether, bis (2,4-dimethylhexyl) ether, dioctyl ether, isopropyl octyl ether, and so forth. Illustrative of ethers which contain cyclic radicals and which are useful for preparation of mercaptans by this invention are bis(2-phenylethyl) ether, dicyclohexyl ether, dibenzyl ether, bis(2,5-dimethylcyclohexyl) ether, bis (2-cyclohexylethyl) ether, bis(1-cyclohexylethyl) ether, cyclohexyl isopropyl ether, and the like.

The process of the invention is particularly effective for the production of secondary mercaptans, and for this purpose ethers of the foregoing formula containing a hydrocarbon radical susceptible of forming such mercaptan, containing at least 3 carbon atoms, will be selected.

The catalysts used in execution of the process of the invention will be oxygen acid compounds. By an oxygen acid compound is here meant an oxygen acid or an acidic oxide, that is, an oxide which hydrates to give an acid. Elements the oxides of which are acidic are the non-metallic elements, such as B, Si, S and P; certain metals in particular valence states, such as hexavalent Cr and Mn, form acidic oxides, but characteristically metal oxides hydrate to give amphoteric or basic compounds. To accomplish the process of this invention, highly acidic catalysts are desirable. The presently preferred catalysts are oxygen acid compounds of non-metallic elements. The present process is adapted for continuous operation, and the catalysts employed are accordingly desirably selected to be non-volatile at the temperatures of operation.

A catalyst of choice in the present process is a supported phosphoric acid. The phosphoric acid employed as catalyst may be orthophosphoric acid, a polyphosphoric acid or the like. A particularly advantageous form of catalyst of this nature comprises a phosphoric acid supported on kieselguhr, the catalyst containing over 50%, and generally from about 60% to about 85% by weight phosphoric acid. If desired, instead of phosphoric acid, the catalyst may comprise a phosphoric acid precursor such as a phosphoric oxide which hydrates to a phosphoric acid. Any suitable carrier material may be employed; illustrative of such carrier supports are, for example, kieselguhr, pumice, or like solid substances having a high degree of subdivision or amount of available surface.

Another acidic catalyst possessing particularly high activity in the present process is a promoted silica catalyst. The catalyst is preferably employed in the form of a synthetic precipitated silica gel promoted by minor proportions of an oxide of metal of group IIIB of the periodic system, such as Al, B, and the like. The promoter oxide most desirably comprises aluminum oxide. For the present purposes, the silica may be activated by the presence of up to 50%, preferably from about 1% to about 20%, of aluminum oxide. Such silica catalysts are well known in the petroleum art as cracking and polymerization catalysts. Suitable silica/alumina catalysts are prepared as described, for example, in U.S. 2,142,324 and 2,147,985.

Other oxygen acid catalysts may alternatively be employed. The presently useful oxygen acid catalysts may be used alone or in combination, and may if desired be promoted by the presence of additional activating constituents. Preparation of the catalyst may also include preconditioning treatments, such as dehydration, pretreatment with hydrogen sulfide and the like. The catalytic materials may sometimes advantageously be supported on carriers such as pumice, carbon, kieselguhr, and similar materials. Preferably, the catalyst will be in solid form; and in general, the present catalysts will be employed in the form of shaped particles of suitable size, which may, for example, be exposed to contact with the reactants in a case or bed, or supported in suspension in the reacting stream. Particles ranging from fine powders to relatively coarse granules or pellets may be employed, depending on the intended mode of utilization.

The process of the invention is conducted by contacting an ether as defined hereinabove with hydrogen sulfide in the presence of the catalyst. Instead of pure hydrogen sulfide, gases rich in hydrogen sulfide may be employed. The ratio of hydrogen sulfide to ether may vary widely, but for the sake of efficiency it is generally desirable that the hydrogen sulfide be present in excess. As shown in the above equation, 2 moles of $H_2$ are consumed per mole of ether transformed into mercaptan, and it is desirable to employ at least this stoichiometric proportion. The molar ratio of hydrogen sulfide to ether may advantageously be even greater, ranging up to about 10:1; even higher ratios are operable, but will generally be uneconomic.

The present process may be carried out at pressures ranging from subatmospheric, through atmospheric, up to superatmospheric pressure. The use of superatmospheric pressure is desirable. A substantial increase in conversion to mercaptan becomes evident above about 50 pounds per square inch gauge (p.s.i.g.), and to obtain the most advantageous results, a pressure of about 100 p.s.i.g. is desirable. Relatively high pressures may be employed in the present process, extending up into the very high pressure range, for example, in the range of 1000–3000 p.s.i.g. However, it is generally unnecessary to resort to such extremely high pressures with consequent requirements for specially designed apparatus. Ordinarily, satisfactory conversions and yields are obtained within the pressure limits of ordinary factory equipment, up to about 350 p.s.i.g. Excellent results are produced in the range of from about 100 to 275 p.s.i.g., and this is the preferred range for operation of the process of this invention.

The temperature at which the reaction is conducted will vary, depending on the nature of the ether used, the catalyst selected, and the reaction conditions. Elevated temperatures, above about 100° C., are usually preferred. Overly high temperatures may produce undesirable decomposition of the reaction components, and ordinarily temperatures below about 500° C. will be selected. An advantageous range for the ethers and catalysts of choice in this invention is from about 150° to about 425° C.

Depending on the reaction conditions, part of the ether converted in the present process may appear in the reaction zone effluent as a product other than mercaptan. In general, little or no sulfide is produced in the process of this invention. However, it has been observed that the formation of mercaptan may be accompanied by the appearance of olefin in the product, where the nature of the ether radicals permits such a transformation. The olefin produced corresponds to the respective hydrocarbon radicals of the ether, less one hydrogen atom each. When conditions conducive to olefin formation are selected, the olefin produced can readily be utilized by recycling it under the conditions of the process to form additional mercaptan by reaction with hydrogen sulfide.

The process of this invention is particularly adapted for continuous operation. In carrying out the present process in a continuous manner the hydrogen sulfide and ether are passed under conversion conditions of temperature and pressure through a reaction zone containing the catalyst fixed in this zone in the form of beds or layers or suspended as finely divided solid particles in the stream of reagents. In such operation, catalyst may be withdrawn from the reaction zone, continuously or intermittently, and replaced or regenerated.

In continuous operation, the hydrogen sulfide and ether may be passed over the catalyst at varying space velocities depending on the temperature and pressure conditions in any specific case. Space velocity here refers to the ratio of the volume of gas passed through a given volume of catalyst per hour (cc./cc. cat./hr.), the volume of gas being reduced to standard conditions of temperature and pressure (0° C., 1 atm.). Catalyst volume is taken as the gross volume of the catalyst bed. In the instant application, the space velocity of the ether reactant alone, which has been found to be an individually controlling factor, is measured and cited. The space velocity of the ether may range up to about 300 cc./cc./hr. but desirably will be as low as is consistent with the economic requirements of the process.

The effluent from the reaction zone, in addition to product mercaptan, may comprise hydrogen sulfide, unreacted ether, and olefin produced by decomposition of the ether. The non-mercaptan materials can readily be separated from the other effluent compounds, for example, by condensation of the effluent at a controlled temperature, or the like, and may, if desired, be recycled to the process.

The invention is illustrated but not limited by the following example.

*Example*

The apparatus employed is constructed of stainless steel and comprises means for metering the ether and hydrogen sulfide into a preheater tube in which the reactants are mixed. The preheater tube leads into a heated reactor tube, in which a catalyst bed of ¼ x ¼" pellets of phosphoric acid on kieselguhr ("Poly" catalyst No. 1, manufactured by Universal Oil Products) lies across the path of a gaseous reaction mixture. The effluent from the reactor passes through a Dry Ice-acetone cooled condenser and is collected in a chilled receiver.

Using the above described apparatus, a mixture of hydrogen sulfide and diisopropyl ether in the molar ratio of 10:1 was passed at an isopropyl ether space velocity of 61 cc./cc./hr. through the catalyst bed at 275° C. under a pressure of about 135 p.s.i.g. Isopropyl mercaptan was obtained in amount corresponding to 41% conversion of the ether.

Similarly, by passage of cyclohexyl ethyl ether with hydrogen sulfide in a ratio of 6:1 over an alumina/silica catalyst at about 250° C. and under a superatmospheric pressure of about 135 p.s.i.g., there is obtained cyclohexyl mercaptan and ethyl mercaptan.

While the invention has been described herein with reference to various particularly preferred embodiments

What is claimed is:

1. A method for the preparation of secondary mercaptans which comprises the steps of forming a mixture of H₂S and an alkyl ether having from 4 to 16 carbon atoms and having the formula

R—O—R¹ where R and R¹ are alkyl radicals, at least one of R and R¹ being a secondary alkyl radical having at least 3 carbon atoms, the molar ratio of H₂S:ether in said mixture being from 2:1 to 10:1, contacting said mixture at a temperature of from 100° C. to 425° C. with an acidic catalyst in solid form, said catalyst being an oxygen acid compound of an element selected from the group consisting of B, Si, S and P and recovering from the resulting reaction mixture a secondary alkyl mercaptan.

2. A method in accordance with claim 1 in which said acidic catalyst is a catalyst selected from the class consisting of a phosphoric acid catalyst supported on a solid carrier and a silica catalyst promoted with an oxide of group III–B of the periodic system.

3. A method in accordance with claim 1 in which said reaction is carried out under a pressure of from 50 to 350 lbs./in.² gage.

4. A method in accordance with claim 1 in which R and R' are alkyl radicals having from 3 to 8 carbon atoms.

5. A method in accordance with claim 1 in which said ether is diisopropyl ether whereby isopropyl mercaptan is obtained.

References Cited in the file of this patent
UNITED STATES PATENTS

| | | |
|---|---|---|
| 2,816,146 | Doumani | Dec. 10, 1957 |
| 2,820,063 | Folkins et al. | Jan. 14, 1958 |
| 2,831,031 | Binning et al. | Apr. 15, 1958 |

UNITED STATES PATENT OFFICE
CERTIFICATE OF CORRECTION

Patent No. 2,957,920                      October 25, 1960

Bernard Loev et al.

It is hereby certified that error appears in the printed specification of the above numbered patent requiring correction and that the said Letters Patent should read as corrected below.

Column 3, line 39, for "2 moles of $H_2$" read -- 2 moles of $H_2S$ --.

Signed and sealed this 11th day of April 1961.

(SEAL)
Attest:

ERNEST .W. SWIDER                      ARTHUR W. CROCKER
Attesting Officer                       Acting Commissioner of Patents